(No Model.)
C. FITZ R. A. H. BAGOT.
VALVE FOR USE WITH PNEUMATIC TIRES, &c.
No. 586,752.  Patented July 20, 1897.
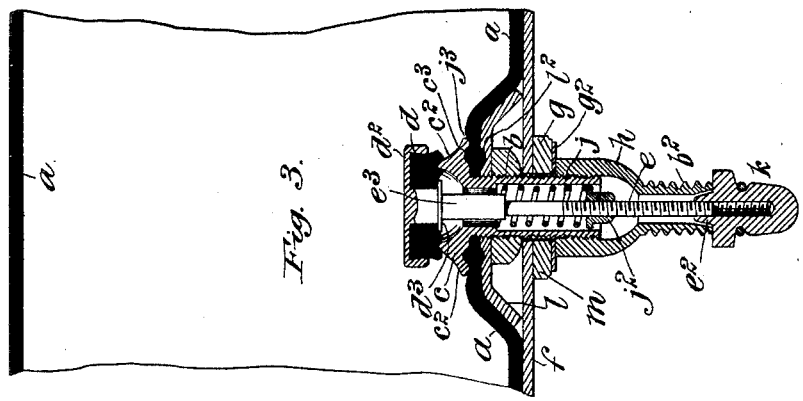
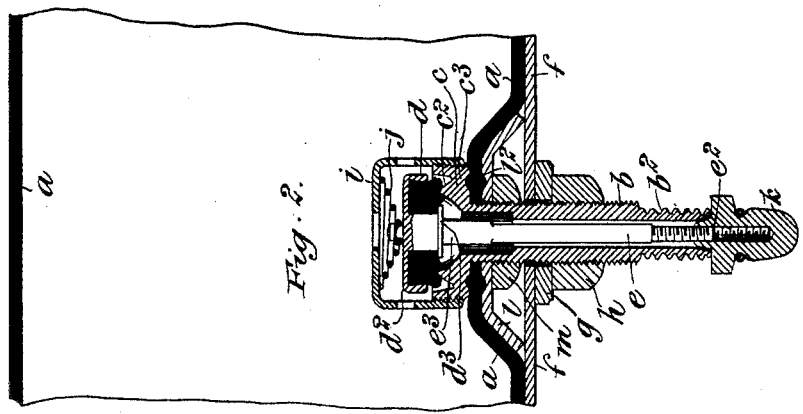
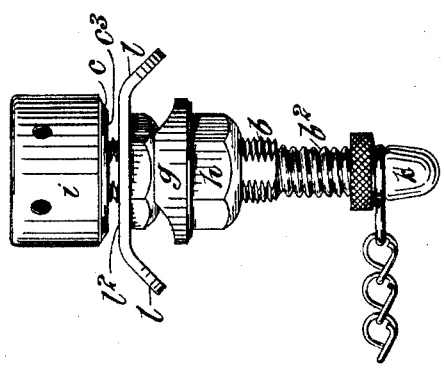
Witnesses:
Louis Wenke
S. C. Connor
Inventor
Charles FitzRoy A. H. Bagot
By his attorney
Howson & Howson

UNITED STATES PATENT OFFICE.

CHARLES FITZ ROY A. H. BAGOT, OF LONDON, ENGLAND.

VALVE FOR USE WITH PNEUMATIC TIRES, &c.

SPECIFICATION forming part of Letters Patent No. 586,752, dated July 20, 1897.

Application filed February 17, 1896. Serial No. 579,619. (No model.)

*To all whom it may concern:*

Be it known that I, CHARLES FITZ ROY ALEXANDER HALLIFAX BAGOT, a subject of the Queen of Great Britain and Ireland, residing at 59 Cadogan Square, in the city of London, England, have invented certain Improvements in Valves for Use with Pneumatic Tires, or in other cases where vessels or chambers are to be charged with fluids, of which the following is a specification.

The object of my invention is to provide a valve which is very simple in construction and efficient in action and not liable to get out of order, which is very readily operated, which acts efficiently as a non-return valve, and wherein the closure is effected by a valve proper and operating parts situated entirely or in main part within the chamber which is to contain the fluid under pressure, the portion projecting being reduced to a minimum, and which valve can be positively locked and the closure assisted by the pressure of fluid in the chamber.

I will explain the invention as applied to a pneumatic tire, from which also its other applications will be readily understood.

The accompanying drawings represent a valve made according to my invention.

Figure 1 is an elevation, and Fig. 2 a section, of an arrangement. Fig. 3 is a section of a modification of the arrangement.

According to my invention, and referring first to Figs. 1 and 2, I secure in the walls of the air-chamber (part of which is shown at $a$) a hollow or tubular socket-piece $b$, having secured to or formed on its inward end a conical or partly-spherical bearing-piece $c$, constituting a seating for the valve proper, $d$, which latter is secured on a stem-piece $e$, passing up through the interior of the socket-piece $b$ and having a screwed end $e^2$ protruding from the outer end of the said socket-piece $b$ to receive the dust-cap, or the said screwed end need not project, but the dust-cap may be provided with a projection to enter the end of the socket-piece to receive the said screwed end, as shown. The said socket-piece $b$ passes through the felly of the wheel (part of which is shown at $f$) and is D-shaped or non-circular at the part which passes through a D-shaped or non-circular hole in the felly, or, if preferred, in the piece $l$, hereinafter referred to, or in both. The said socket-piece $b$ need project only sufficiently from the outward side of the felly to receive a washer $g$ and securing-nut $h$, screwed thereon, and to form the nozzle $b^2$ upon which the pump is to be screwed for forcing in air, or the socket-piece $b$ may, as shown in Fig. 3, project only sufficiently to receive the washer and a nut $h$, which nut $h$ may itself be formed with the nozzle $b^2$ for the attachment of the pump, the india-rubber washer $g^2$ being for insuring a tight joint.

The valve-stem $e$ and valve $d$ are pressed outwardly (*i. e.*, to the closed position) by a spring or springs, which may be of any suitable kind—for instance, as shown in Fig. 3, a spiral spring $j$, contained in a chamber in the part of the socket-piece $b$ inward or in part inward of the felly and bearing on a projection $j^2$ on the stem $e$ and at its other end on a flange at the lower end of the socket-piece $b$, or springs may be caused to press on the valve itself and be attached thereto. For instance, as shown in Fig. 2, there may be a cage or perforated cup $i$ secured to a screw formed on the edge of the conical or partly-spherical bearing-piece $c$ and the spring $j$ be placed between the valve and the said cage or cup.

The stem-piece $e$ may be guided and prevented from turning by any suitable projections from itself or from the interior of the socket-piece which will not allow the stem-piece to rotate, but will allow it to move longitudinally, and will also allow of the passage of air through the space between the stem-piece and the socket-piece. This is shown as being effected by a square part at $e^3$, sliding in a squared part of the hole through the socket-piece $b$, but with spaces for air at the sides of the square, or the spring or springs used may be connected to the valve and arranged so as to prevent the valve and stem from turning. The spring or springs act to cause the valve proper to bear upon its seat $c^2$.

The dust-cap $k$ is screwed upon the screwed end $e^2$ of the stem-piece $e$ and bears on the outer edge of the nozzle $b$, so that by screwing up the dust-cap $k$ the stem-piece $e$ is drawn outward and the valve proper, $d$, is forced and retained firmly against its seat, and the valve is securely locked in its closed position.

The valve proper is provided with a pad of rubber or other sufficiently flexible or yielding material, preferably sprung into an undercut groove in the inside of a rim formed on the valve-disk $d^2$ and retained by the flange $d^3$ on the valve-stem $e$. The conical or partly-spherical form at $c^2$ of the seat, against which the valve-pad bears, forms a very effective closure, as the edge is angular, or approximately so, while the parts outward of the edge afford a sloping or curved surface, against which the rubber or the like can close by its own elasticity.

The air-chamber and valve are secured together by an arrangement which prevents all leakage of air at the joint. It consists of a piece $l$, fitting the inside of the felly on the one side and on the other bearing against the outer side of the material of the air-chamber $a$ and pinching it between itself and the back of the conical or partly-spherical piece $c$, the opposed faces of these two parts, which bear on the material of the air-chamber, being waved or formed with circular grooves and depressions constituting a projecting nipping-ring or two or more of such rings opposite each other on the said faces to present one or more alternating pinching parts and recesses, as shown at $l^2$ $c^3$, the pinching parts gripping the material of the air-chamber and the recesses allowing the elasticity of the said material to act to insure a good joint. A nut $m$ is screwed onto the exterior of the socket-piece $b$ to force the parts together. When the chamber is to be charged with air or other fluid, the dust-cap $k$ is removed and the pumping device is attached to the nozzle-piece $b^2$ by screwing it thereon. The spring $j$ (or springs) will on the forcing stroke of the pump yield to allow air to pass the valve, and the air or other fluid is forced inward by the pump, and the said spring $j$ (or springs) will return the valve proper to its seat at each return stroke of the pump, so that the valve acts as a non-return valve. When the pump is removed and the dust-cap $k$ is screwed on again, the said cap will draw outward the valve-stem $e$ and again lock the valve proper, $d$, firmly against its seat $c^2$. On removing the dust-cap $k$ the stem $e$ of the valve can be readily forced inward to allow the fluid under pressure to escape when required.

Although I have described the invention as applied to a pneumatic tire, it may be applied to air-cushions or be employed for any other analogous purpose where charging with air or other fluid is to be effected.

Having now particularly described and ascertained the nature of my said invention and in what manner the same is to be performed, I declare that what I claim is—

A valve consisting of a socket-piece having a conical surface on its inner end to form a valve-seat, and a valve proper comprising a disk $d^2$ provided with a rim forming an undercut groove, a stem provided with a flange $d^3$ and a flexible pad adapted to be sprung into the undercut groove and under the flange $d^3$, all substantially as set forth.

In testimony whereof I have signed my name to this specification in the presence of two subscribing witnesses.

C. FITZ ROY A. H. BAGOT.

Witnesses:
EDWD. GEO. DAVIES,
WILLIAM F. UPTON.